(12) United States Patent
DeLangis

(10) Patent No.: US 11,842,824 B2
(45) Date of Patent: *Dec. 12, 2023

(54) SELF-RECHARGING DIRECT CONVERSION ELECTRICAL ENERGY STORAGE METHOD

(71) Applicant: Eric M. DeLangis, Wylie, TX (US)

(72) Inventor: Eric M. DeLangis, Wylie, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/468,045

(22) Filed: Sep. 7, 2021

(65) Prior Publication Data

US 2022/0115158 A1    Apr. 14, 2022

Related U.S. Application Data

(63) Continuation of application No. 16/354,085, filed on Mar. 14, 2019, now Pat. No. 11,114,213, which is a continuation-in-part of application No. 15/728,397, filed on Oct. 9, 2017, now abandoned, which is a continuation of application No. 13/851,890, filed on Mar. 27, 2013, now Pat. No. 9,786,399.

(51) Int. Cl.
| | | |
|---|---|---|
| *G21H 1/04* | (2006.01) | |
| *H01M 10/46* | (2006.01) | |
| *G21H 1/06* | (2006.01) | |
| *H01G 9/28* | (2006.01) | |
| *H01M 10/05* | (2010.01) | |
| *H01M 10/44* | (2006.01) | |

(52) U.S. Cl.
CPC ............... *G21H 1/04* (2013.01); *G21H 1/06* (2013.01); *H01M 10/46* (2013.01); *H01G 9/28* (2013.01); *H01M 10/05* (2013.01); *H01M 10/44* (2013.01)

(58) Field of Classification Search
None
See application file for complete search history.

(56) References Cited

U.S. PATENT DOCUMENTS 11,114,213 B2 * 9/2021 DeLangis ............. H01M 10/46

* cited by examiner

*Primary Examiner* — Alix E Eggerding
(74) *Attorney, Agent, or Firm* — Clay McGurk; Law Office of Clay McGurk

(57) ABSTRACT

A method for collecting and storing the energy emitted by radioisotopes in the form of alpha and or beta particles is described. The present invention incorporates aspects of four different energy conversion and storage technologies, those being: Nuclear alpha and or beta particle capture for direct energy conversion and storage, fuel cells, rechargeable electrochemical storage cells and capacitive electrical energy storage.

11 Claims, 11 Drawing Sheets

SELF-RECHARGING DIRECT CONVERSION ELECTRICAL ENERGY STORAGE METHOD

CROSS-REFERENCE TO RELATED APPLICATIONS

This application is a continuation of U.S. patent application Ser. No. 16/354,085 filed Mar. 14, 2019, now U.S. Pat. No. 11,114,213, which is a continuation-in-part of U.S. patent application Ser. No. 15/728,397 filed Oct. 9, 2017, now abandoned, which is a continuation-in-part of U.S. patent application Ser. No. 13/851,890 filed Mar. 27, 2013, now U.S. Pat. No. 9,786,399, all of which are hereby incorporated by reference in their entirety.

BACKGROUND OF THE INVENTION

The idea of using radioactive materials as direct power sources for applications requiring long-lived power sources has been investigated for many decades. Nuclear power sources for deep space probes have been used on many NASA programs especially those that last for decades and where the probes will not have sufficient sunlight for solar panels to operate. Nuclear Batteries, also called atomic batteries, have been developed that attempt to exploit the heat or thermal energy of the radioactive materials as well as the alpha and beta particle emissions energy through various means. Typically, these devices tend to be large in comparison to typical electrochemical batteries and also tend to suffer from the emissions of high energy particles including alpha, beta, gamma and neutrons which create human health risks. Besides space probes, small nuclear power sources have been successfully used in devices such as pace makers and remote monitoring equipment.

One area of much research has to do with the direct conversion of beta emissions, i.e. electrons, emitted from radioisotopes that are targeted on a semiconductor material to develop electron-hole pairs and thus generate an electrical current in the semiconductor. All of these devices suffer from very low efficiencies due to the poor electron capture cross section of the designs as well as the semiconductor material itself. This is the same phenomenon that solar cells continue to suffer from even after decades of work and hundreds of billions of dollars of investment.

Researchers have recently begun investigating nanotechnologies with which to implement nuclear power sources. Some of these include the development of micromechanical devices that vibrate or rotate in response to charge build up within the semiconducting materials.

The underlying reason for pursuing the development of nuclear batteries is the much wider goal of developing long lasting, low cost power sources. Along these lines, there are many other fields of research that are producing some interesting and potentially viable power sources. In particular, fuel cells and new electrochemical battery technologies look particularly promising for small, low cost, high density and long-lived power sources but none come close to the energy density and longevity that nuclear power sources offer.

Prior art describes four basic methods of converting radioisotopes into useable energy sources. Three of these require a double conversion process wherein the radioactive sources are used to first generate heat, light or mechanical energy which is then converted into electrical energy. These multiple conversion processes have extremely low efficiencies which puts them at a distinct disadvantage to compete with the fourth method which is referred to as direct conversion.

Of the direct conversion methods, the two that are the most studied are the semiconductor PN junction conversion and the capacitive charge storage conversion. The semiconductor conversion processes, also known as betavoltaics, employs semiconductor technology that suffers from device degradation and very low efficiencies. The capacitive charge storage devices have problems with large size and very high voltages that can reach hundreds of thousands of volts that create materials challenges that can withstand such high voltages. These problems are magnified as the devices are scaled down.

A common problem for all of the prior art is that the amount of energy that can be extracted from the radioactive material is a very low level and at a consistent output which doesn't provide a practical means to support real world applications that demand varying amounts of power at different times.

Of the most relevant descriptions of a nuclear batter disclosed in prior art, Baskis, U.S. Pat. No. 5,825,839, describes a direct conversion nuclear battery utilizing separate alpha and beta sources isolated by an insulating barrier and two charge collector plates, one to collect the negative beta particles and another plate collect the alpha particles. The two plates become charged and thereby storing the energy in the form of an electric potential the same as a capacitor stores electrical energy in the form of positive and negative charges on parallel plates. This approach utilizes the balanced alpha/beta charge approach as the present invention, but for completely different purposes. In the Baskis disclosure, a load place across the "battery" allows electrons to flow from the negative charged plate to the positively charged plate that is saturated with alpha particles. The recombination of the electrons and the alpha particles is said to produce helium gas which is vented out of the cell. However, this description does not address the recombination of "free" electrons in the metal plate combining with the alpha particles producing He gas directly. However, the net effect is the same, the positive plate will become increasingly positively charged by the alpha particles producing a stored electric potential across the device.

The preferred embodiment of the present invention also suggests the use of balanced alpha and beta charges for greater efficiencies, however, such a requirement is not necessary for it to operate. Additionally, the present invention can store the energy of the alpha and or beta particles in chemical energy form as a chemical battery as well as in electric potential energy as in a capacitor, as described in alternative embodiments.

BRIEF SUMMARY OF THE INVENTION

The present invention incorporates aspects of four different energy generation and storage technologies, those being: Nuclear beta and/or alpha direct conversion, fuel cells, rechargeable electrochemical storage cells and capacitive energy storage. In the present invention, a radioisotope, or a mixture of radioisotopes, that emits beta and/or alpha particles is used as the primary energy source while an electrochemical cell is used as both a secondary energy source as well as an energy storage mechanism and a capacitor that may be used as a primary storage device as well.

This disclosure illustrates the core concepts for the construction and manufacture of the device but by no means limits the actual materials to only those used as examples and discussed herein nor the embodiments described. For example, almost any radioisotope can be used as the primary fuel source for this invention but those that are, at this time, considered safer, more optimal or more readily accessible are more desirable, especially for devices that could be used for equipment that will be in close proximity to humans or animals. As research continues and future advanced occur, it may become feasible that other radioisotopes may be well suited for use in this device and the following discussions are by no means intended to limit the invention to only the specific materials used or discussed herein. This is true for the materials used including those for the electrochemical and capacitive storage materials as well.

Additionally, no limitations to the embodiments of the described invention are to be inferred. This disclosure is to be interpreted in its broadest sense as to any materials that can be used as well as to the physical embodiments in which the concepts can be applied. For instance, there are hundreds of radioactive materials that can emit alpha and or beta particles and electrochemical batteries and capacitors can be built in an unlimited number of shapes, sizes, storage capacity, energy densities or materials. There are also many rechargeable battery chemistries that can be used in said present invention and no limitations as to the type of rechargeable battery or chemistry that can be used to implement such a device is implied.

Any radioisotopes or combination of radioisotopes that emit alpha and or beta particles can be used for this device. However, because the device takes advantage of both the positive charges of the alpha particle and the negative charge of the beta particle, to generate dc current directly as well as to provide a charging mechanism for the electrochemical cell, radioisotopes that produce both particles are expected to produce greater energy density and efficiencies than isotopes that produce only alpha or beta particles, however any combinations of radio isotopes or individual radioisotopes can be used. Radioisotopes that produce low energy alpha and or beta particles are particularly useful in this application since the emissions can be contained within the structure itself, thus eliminating the health issues of ionizing gamma and or neutron radiation. Isotopes that produce gamma rays and high-energy neutron are less desirable due to their associated health risks, and the inability to completely contain these emissions within the power cell itself. However, the power cell can be adapted for their use for certain applications where these issues are not a concern, for instance in generating electrical energy from nuclear waste products stored in long term storage facilities. In this case, the hazardous material is already placed in secured facilities where the high-energy emissions cannot harm persons or the environment. Using any or all available radioisotopes to generate electrical energy would be a good use for this invention. Additionally, space probes could, from a human safety standpoint, use any radioisotope material.

While the invention has been described with reference to some preferred embodiments of the invention, it will be understood by those skilled in the art that various modifications may be made and equivalents may be substituted for elements thereof without departing from the broader aspects of the invention. The present examples and embodiments, therefore, are illustrative and should not be limited to such details.

DETAILED DESCRIPTION OF THE INVENTION

Figure 1:
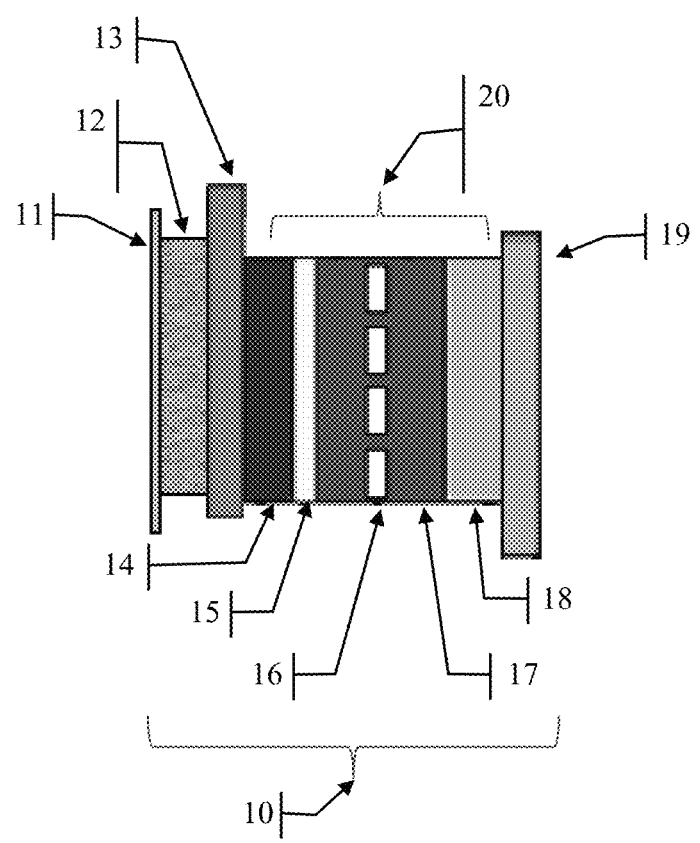
FIG. 1 illustrates a cross-section of a device according to a preferred embodiment of the invention.
Figure 2:
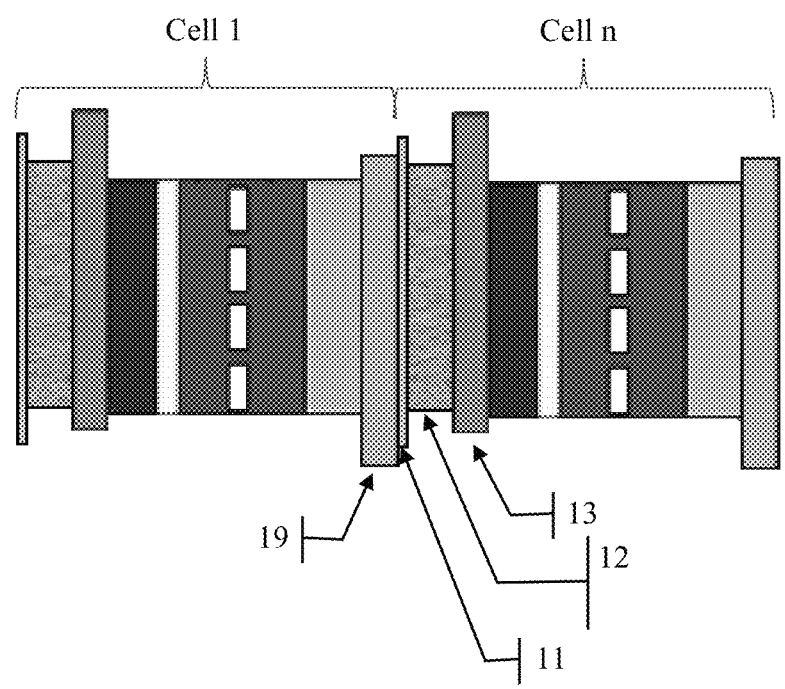
FIG. 2 illustrates a stacked cell configuration.

For the following discussion, refer to FIG. 1. The device 10, comprises a rechargeable electrochemical cell 20, such as a Lithium Ion cell, which may be comprised of a cathode plate 19 such as aluminum, a Li ion capture material 18 such as $LiCoO_2$ (or $LiMnO_2$, or others), an electrolyte material 17 such as a lithium salt dissolved in organic solvent with a semipermeable membrane 16 separating the anode and cathode sides of the cell, a carbon anode 14 with an plate 13 such as copper, a layer of radio isotope material or a mixture of radio isotope materials 12 which emit alpha and or beta particles, with or without a bonding agent (not shown) and a proton exchange membrane layer with an electrolyte material 11 that is comprised of a highly negatively charged material, and if necessary, a dielectric insulating layer (not shown). These layers can be rolled up to produce a typical cylindrical battery device, referred to in the industry as a "jelly roll," and shown in FIG. 6, or stacked on top of each other in many layers to produce irregular shapes and sizes that would be used in consumer electronic devices as shown in FIG. 2. While the secondary battery technology described herein happens to be a Li-Ion type battery, any battery storage technology compatible with this invention can be used, and a person skilled in the art of battery chemistry and technologies could easily adapt any battery technology to be useful in this invention.

For the purpose of the following discussions, where the term membrane is used, it should be understood to mean either just the membrane itself or the combination of the membrane and the electrolyte material within the context of the discussion. Additionally, the membrane and electrolyte materials should be understood to be a membrane material surrounded by an electrolyte material (typically of liquid composition) or a solid-state membrane/electrolyte material that is of a solid composition.

The amount of radioisotope material that would be needed in a particular power cell would depend upon the activity level of the particular material used and the amount of energy that the power cell would need to provide for a specific application.

Figure 6:
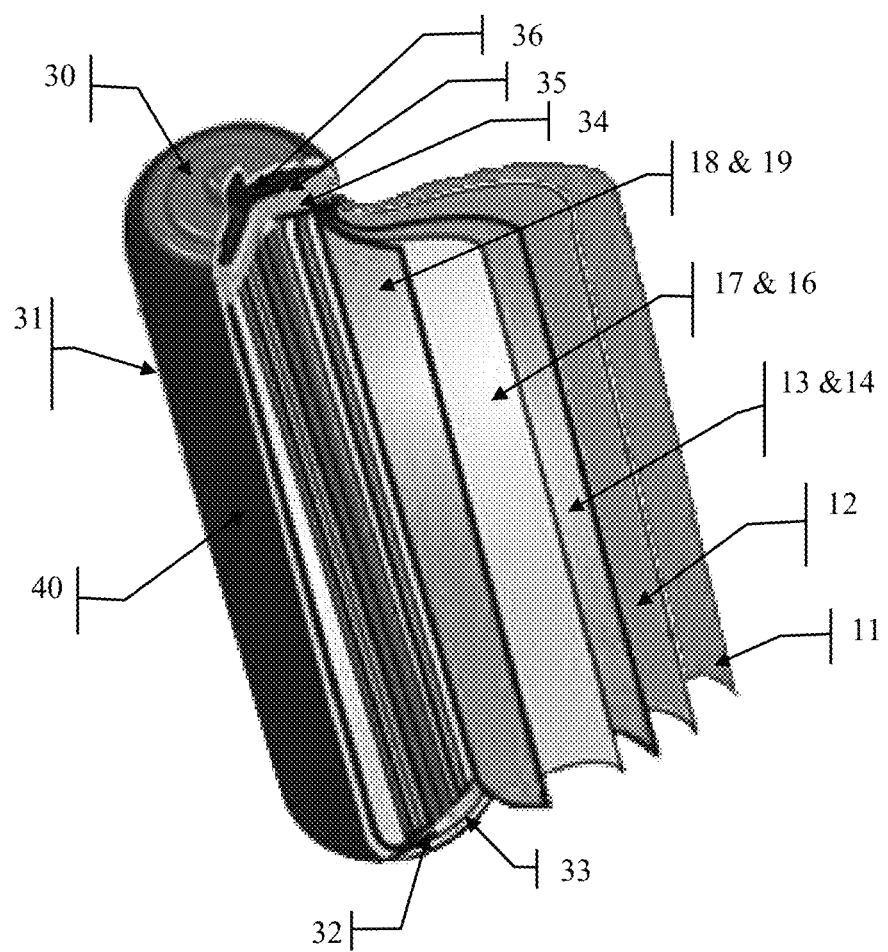
FIG. 6 illustrates an embodiment of an implementation in a form of a standard cylindrical battery that is commonly available.

FIG. 2 shows a cross section a stacked cell implementation of the invention as the cells would exist relative to each other. This orientation would exist whether individual cells are stacked on top of each other or a long single cell was rolled up into a cylindrical shape. In FIG. 6, the layers of the cell would be rolled up upon themselves to create a cylindrical form similar in size and shape of common commercially available batteries such as "AA", "AAA", "C" and "D." Of course, any shape or size can be constructed by stacking the layers shown in FIG. 2. When stacking layers, the PEM (Proton Exchange Membrane) layer 11 would be located between the radioisotope material layer 12 and the cathode plate 19. Also note that the cathode plate 19 and the anode plate 13 are offset with respect to each other and with respect to the PEM layer 11 so as to prevent shorting the cells when they are assembled as well as to allow each cathode plates 19 to be connected together on one end or side of the cell and the anode plates 13 to be connected together on the other end or side of the cell. This also provides a means to connect the anode and cathode to the cell contacts for external connections.

Theory of Operation

Figure 3:
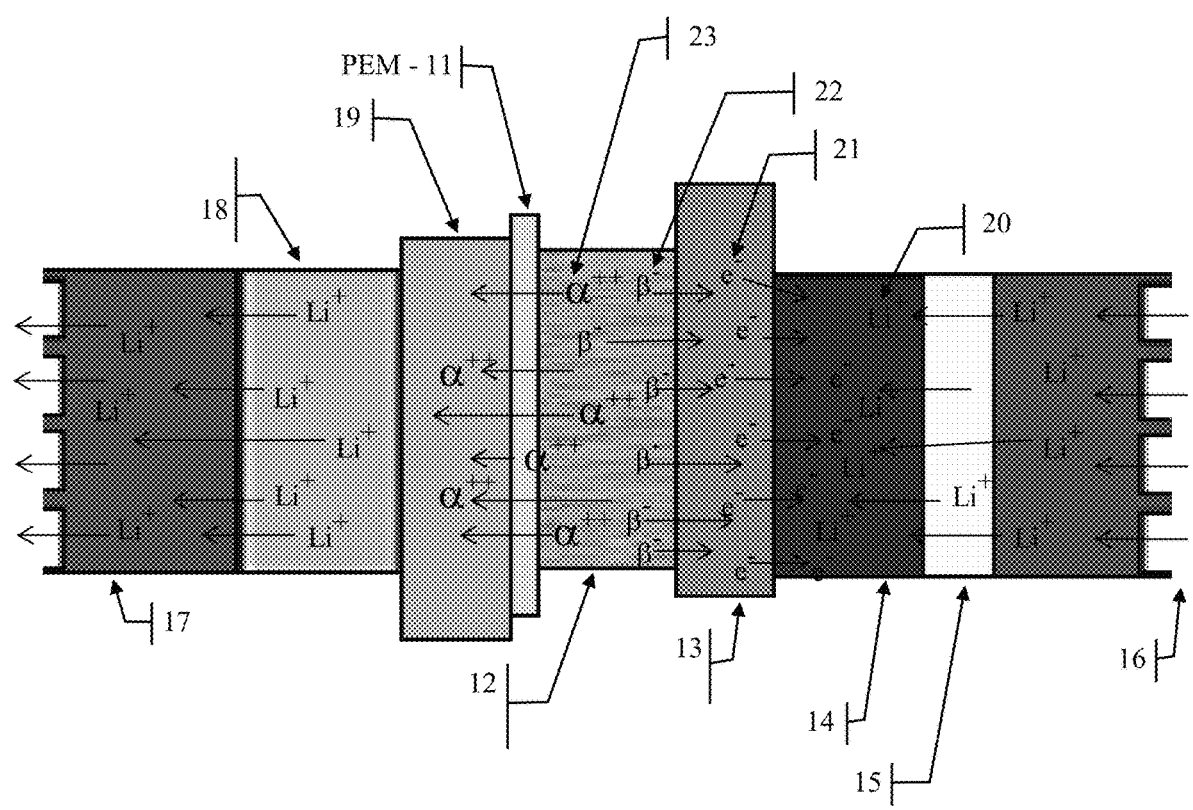
FIG. 3 illustrates an internal self-recharging process.

Refer to FIG. 3 for the following discussion. A key aspect to the invention is the adoption of a proton exchange membrane 11 (PEM) similar to that used in fuel cell technologies. A common type of material used for this application is Nafion. There are a number of proton exchange membranes available that can be used in the present invention. In fuel cells, the PEM is a highly electronegative porous material that allows the positive charged "protons" to cross the membrane boundary between the anode and cathode while repelling the disassociated electrons and forcing them to flow around the cell, through an external circuit. These PEM characteristics are exploited in the present invention to allow the doubly positively charged alpha particles 23, which are approximately the same size as methanol "protons" to pass through the PEM material 11 and collect in the cathode plate 19, while forcing the beta particles 22, i.e. electrons, to flow to the anode plate 13 and collect there. The positive charges carried by the alpha particles 23 and captured by the cathode plate 19 and the negative charges carried by the beta particles 22 and captured by the anode plate 13 will migrate to their respective cathode 18 and anode 14 regions causing the cell 10 to store the charges. These charges would then cause the lithium ions 20 to migrate from the cathode 18 through the electrolyte region 17, across the separator membrane 16, further across the solid electrolyte interphase (SEI) layer 15, which is formed upon first charging, and finally to in situate themselves, intercalate, within the carbon layers of the anode 14, thus completing the charging cycle for a pair of alpha 23 and two beta 22 particles.

Figure 5:
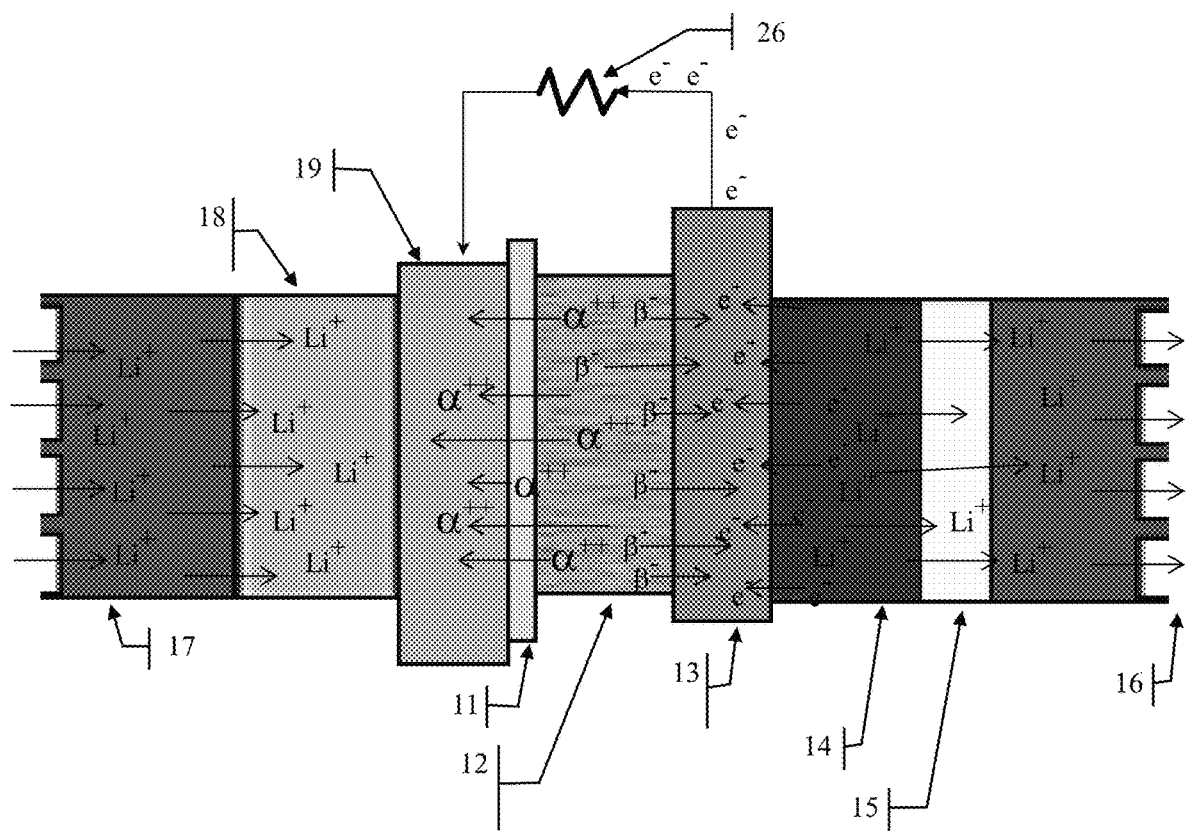
FIG. 5 illustrates a discharge process.

Referring to FIG. 5, when an electrical load is placed across the anode plate 13 and cathode plate 19, an electric circuit would be completed causing electrons from the anode 14 to migrate to the anode plate 13, through the external circuit 26 and returning to the cell at the cathode plate 19. The ideal cell would be achieved when amount of radio isotopic material 12 and the external electrical load 26 were balanced where the total electrical current emanating from the radioisotope region into the anode plate 19 and cathode plate 13 were to equal the amount used by the electrical load 26. This is an ideal condition that is unlikely to ever be achieved. Normally electrical loads have varying power requirements and this is where the rechargeable electrochemical storage portion 20 of the cell 10 plays it role. It will provide additional power to the load 26 when it is needed and it will store the excess energy coming from the radio isotope material 12 for later use.

If an electrical load were connected across the anode plate 13 and cathode plate 19, an electric circuit would be completed causing electrons from the anode 14 to migrate to the anode plate 13, through the external circuit 26 and returning to the cell at the cathode plate 19. The ideal cell would be achieved when amount of radio isotopic material 12 and the external electrical load 26 were balanced where the total electrical current emanating from the radioisotope region into the anode plate 19 and cathode plate 13 were to equal the amount used by the electrical load 26. This is an ideal condition that is unlikely to ever be achieved. Normally electrical loads have varying power requirements and this is where the rechargeable electrochemical storage portion 20 of the cell 10 plays it role. It will provide additional power to the load 26 when it is needed and it will store the excess energy coming from the radio isotope material 12 for later use.

Figure 4:
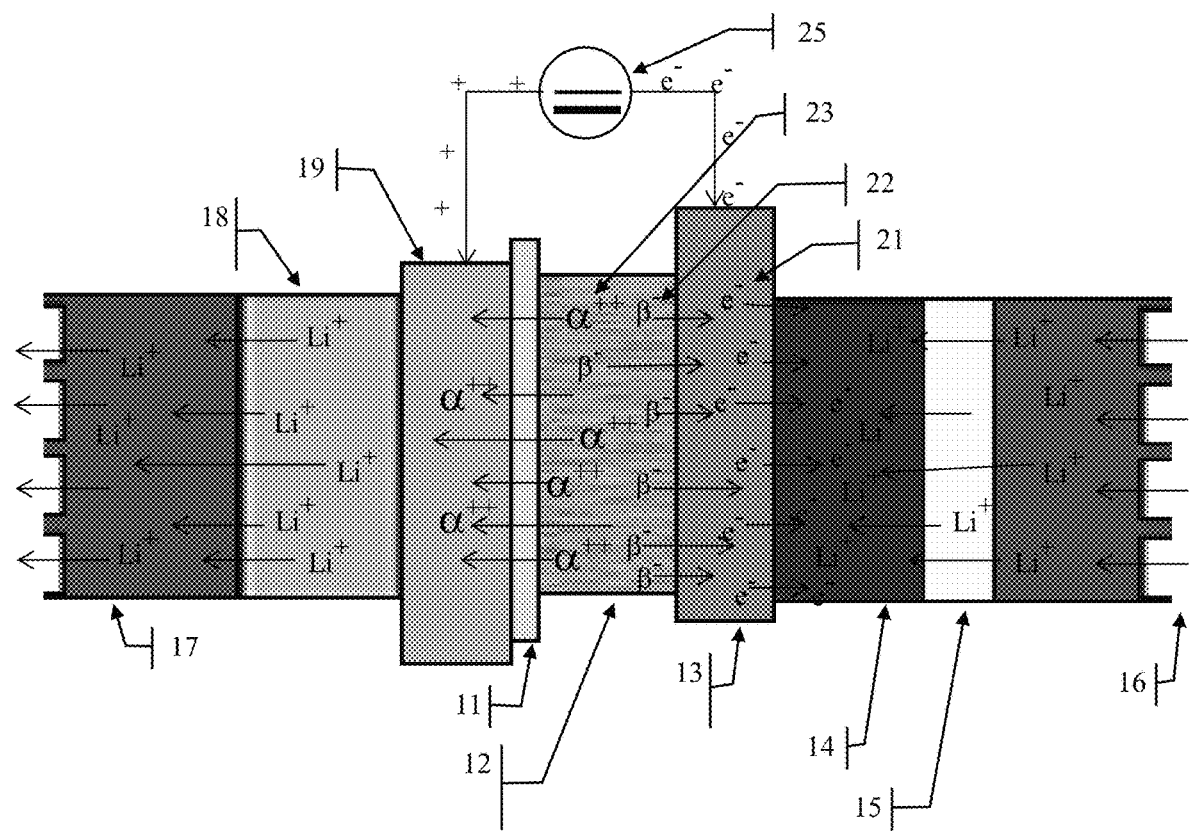
FIG. 4 illustrates an attachment and use of an external DC charge circuit.

Referring to FIG. 4, as with any secondary electrochemical cell, the present invention can be recharged by means of an external charging circuit 25 placed across the cathode plate 19 and anode plate 13. The charging circuit 25 injects electrons 21 into the anode plate 13 which migrate into the anode carbon layer 14 and speed up the lithium ion battery charging process as shown in FIG. 3.

During discharge, the beta particles 22 (electrons) emitted by the radio isotope layer 12 will flow directly through the anode plate 13 to power the external load 26 while the alpha particles will accumulate at the anode, completing the circuit. The current developed from the radioisotope material 12 will power the load reducing the draw from the stored energy of the secondary electrochemical battery cell 20. However, when the current drawn by the load 26 is less than the current developed by the radioisotope material 12, then the excess current will charge the secondary battery cell 20, thus acting as a charging circuit for the secondary electrochemical storage battery 20, the same as if the secondary battery were being charged from an external charging device 25.

Because of the affinity of the anode 14 to accept electrons and the highly electronegative characteristics of the proton exchange membrane (PEM) 11, the beta particles 22 are attracted to the anode plate 13 and collect there developing an overall negative charge on the plate which is transferred to the anode carbon layer 14. The increasingly negatively charged carbon anode 14 attracts positive lithium ions 20 from the electrolyte 17 causing the migration of the lithium ions 20 from the lithium metal oxide cathode 18. At the same time, the alpha particles 22 are attracted by the overall negatively charged proton exchange membrane (PEM) 11 and migrate towards it. The PEM 11 doesn't have any binding sites for the alpha particle and its physical properties allow the alpha particles 22 to pass through it to the cathode plate 19 where they are able to bind with the cathode plate 19 and transfer their positive charges to the cathode plate 19, thereby oxidizing the cathode layer 18 and liberating more lithium ions 20 to migrate across the cell to the anode 14.

Alternative Embodiments

Since the radioisotope material 12 continually emits alpha and/or beta particles 22 and 23, at some point the battery will become fully charged with all Lithium ions 20 being intercalated within the carbon material of the anode 14 but the radioisotope material 12 will still be developing an electrical potential. Some of this unused electrical potential can be stored in an integral super capacitor (not shown in drawings) surrounding the entire battery device but inside the enclosure 31.

During normal operation, helium gas will be produced around the cathode and PEM or bidirectional membrane materials by the combination of alpha particles and electrons. This gas is vented off through a vent 36. Since helium gas is nontoxic and nonflammable, no special precautions need to be taken with this emission. However, it could be captured as a useful byproduct.

The super capacitor is created by connecting one thin metal plate (not shown in drawings) to the anode plate 13, another thin metal plate (not shown in drawings) attached to the cathode plate 19 and a thin insulating material (not shown in drawings) separating said plates. These two thin metal plates and separator would be wound around the outer surface of the battery as many times as desired to create a super-capacitor of the desired power characteristics.

Eventually, depending upon the total energy storage capacity of the device and the system load demands, one of two conditions will occur. Either the cell will be completely depleted or it will become fully charged. In the event of a full charge within the electrochemical cell and any integral capacitor of the battery, the excess energy will have to be exhausted as heat. This excess energy is most effectively released through a resistive material (not shown in drawings) around the outer surface of the cell but inside the protective metal enclosure 31 or incorporated as an integral part of said enclosure 40, so as to radiate off excess energy as heat into the surrounding environment. A built-in charging and discharging control circuit can be used to control the excess energy bleed off.

A second situation exists where the device becomes completely discharged and cannot provide sufficient power for the intended load. At this point, the equipment which is powered by the device is turned off or the power cells are changed out for fresh cells. In either circumstance, the radioisotope will recharge the cell. Current lithium battery technologies limit discharge to about 40 percent. A deep discharge will damage the battery and limit its lifespan. This situation is prevented by a charge control circuit which will prevent battery damage due to overcharging or over discharge.

Alternatively, a standalone self-charging nuclear capacitor is made by applying a thin layer of the radio isotope to one side of a thin metal foil then a layer of the PEM or bidirectional membrane material over the radio isotope combined with a binding material followed by the second metal foil layer and finally a dielectric membrane is placed on the top of the second foil layer. These layers are then rolled up so that the two metal layers are separated by the dielectric membrane. The metal foil layers are chosen just as in any electrolytic capacitor so that the plates have a propensity to attract and store positive or negative charges. An example would be aluminum and tantalum foils.

As described above, this capacitor can be implemented directly in the nuclear rechargeable electrochemical power cell by adding the capacitor layers sandwiched in the radioisotope layer. If the cell design characteristics are chosen to incorporate a high voltage capacitor to store more power, a voltage regulator would be needed to regulate the charge voltage for the electrochemical cell to protect it from damage from over charging and over voltage. A large amount of energy can be stored within this super capacitor that can be used for loads that demand very high currents for very short periods of time or if regulated can produce lower voltages for longer periods of time, or even other voltages than that of the battery.

Since alpha particles possess a positive double (+2) charge, they are easily deflected by electric or magnetic fields. The electric field generated by the cell construction, with or without the high voltage capacitor may be effective in driving the alpha particles towards the cathode collector plate and thus, increasing efficiency. Similarly, the addition of a magnetic material layer that creates a magnetic field that directs the alpha particles towards the cathode may also be effective in increasing efficiency. These same phenomena may also serve to push the electrons towards the cathode as well.

The amount of radioactivity emissions from materials that are generally considered "safer" than other radioactive materials tend to be too low powered for use as a direct energy source for present day electronic devices. The goal of designing a high energy, long lasting and safe nuclear power source is confounded by fundamental material limitations where the amount of energy emitted is roughly inversely proportional to the half-life of the material. That is, the higher the energy output, the shorter the half-life. The goal is to develop devices that can last many years to several decades that can also produce the sufficient output power to run electronic devices or system without undue risks to human life or the environment.

Research into betavoltaics using P-N junctions in silicon and other semiconductor materials has been focused on creating electron-hole pairs near the P-N junction of the semiconductor material. These electron-hole pairs develop a current across the P-N junction when a beta particle is ejected from the radioactive material and travels through the semiconductor material. Much research has been spent on building 3D structures within the semiconductor materials to hold the radioactive material in such a manner that would capture as many beta particles as possible to produce the most electron-hole pairs as the beta particle travels through the semiconductor material. Some research suggests that as many as 2000 electron-hole pairs can be generated with each beta particle emitted from a tritium source. There are a couple major problems with this approach. The first being that these techniques require expensive silicon wafer production facilities and their associated high costs for the base semiconductor wafers. The second is that the semiconductor materials deteriorate from lattice destruction caused by the kinetic energy of the beta particles. These devices tend to fail in a relatively short period of time (months to a few years) from even the lowest energy beta emitters. Recent advances in semiconductor P-N junction materials have extended the life of these devices to as much as ten years. Destruction of the P-N junction and semiconductor lattice structure renders the already low efficiencies of this method to steadily decrease over time.

Recent research has shown very low-cost amorphous metal oxide materials to be effective electron-hole generators. Additionally, since amorphous materials require neither a fabricated P-N junction layer nor a monocrystalline lattice structure, electron-hole pairs can be generated for long periods of time without the concern of the material experiencing structure breakdown. A secondary benefit is that these materials are very inexpensive.

To increase the electron-hole generation in the present invention, a layer of amorphous semiconducting material, or any other material found to be generous electron-hole pair generator, can be mixed with or applied on either or both sides of the radioactive source material that will generate a cascade of electron-hole pairs as the alpha and or beta particles travel through it. See FIG. 7. When a combination of radioactive material and amorphous semiconductor material is used in the radioisotope layer of the cell as shown in FIGS. 7 through 10, the PEM material must be changed to a bidirectional membrane material. The bidirectional membrane along with a suitable electrolyte material still provides a physical isolation of the radioisotope material 12 & 46 from the cathode plate 19 while still allowing alpha particles to flow through it to the cathode 19, as was the case with the PEM material, but also provides a path for electrons to flow from the cathode 19 to fill the holes in the amorphous semiconducting material that migrate through the radioactive/semiconducting material layer and collect at the interface between this layer and the bidirectional membrane. Since the present invention doesn't rely on a fabricated P-N junction layer to develop a voltage differential across the cell, very inexpensive amorphous semiconductor material of various kinds can be used as the electron-hole generation material. The electric field developed by the cell chemistry will naturally draw the electrons towards the anode plate while the holes will be drawn towards the cathode plate and collect at the bidirectional membrane layer interface.

Research has also shown that the effective electron-hole generation capabilities of low energy beta emitters such as tritium extend only a few hundred microns deep into a semiconductor material with most electron-hole generation occurring between 1 micron and 10 microns. Two of the main processes that contribute to the inherent low efficiencies of the semiconductor P-N betavoltaic approach are that there is a high rate of reabsorption of the emissions from the bulk radioactive material and the recombination of the electron-hole pairs in the semiconductor material. The rate of reabsorption is proportional to the thickness of the bulk material used in the cell. If the radioactive material is thicker than a few microns to a few hundred microns then the rate of reabsorption increases with the additional thickness since only those emissions closest to the surface of the material are likely to escape to be used to generate power. On the other hand, semiconductor P-N junctions that are deposited on the surface of a semiconducting chip structure are unable to capture many of the electron-hole pairs generated at deeper layers of the semiconductor because the electron-hole pairs have a greater chance of recombining within the bulk semiconductor body before they can migrate through it and combine at the anode and cathode to contribute to the cell's power output. Additionally, as in betavoltaics where the radioactive material is deposited on the top surface of a semiconductor material only 50% of the particles that are ejected by the radioactive material enter the silicon layer to create electron-hole pairs. The other 50% of particles that are emitted away from the semiconductor material are wasted and only generate heat.

By depositing the radioactive material in a very thin layer, something on the order of tens to hundreds of microns, the reabsorption can be reduced and almost eliminated since most of the emissions will be close enough to the surface of the material to escape into the surrounding materials where they can be captured and used for power generation. Since the distance that a particle will travel through a solid material depends upon its energy as well as the material it is traveling through, the optimal thickness of the radioactive material layer will probably be determined based upon these factors. This thin layer approach is the optimum structure for a radioactive material-based power cell. When structured in this fashion, the goal is to maximize the emissions from within the radioactive material will be able to escape the bulk material and thereby limit the reabsorption effects. This is because the radioactive source material layer would be so thin that most of the emissions would have a high probability of escaping from the large surface areas of the layer and only the relatively few emissions that occur along the axis of the layer would have a high probability of recombination. Reducing the thickness of the amorphous semiconductor layers will allow some of the more energetic alpha and beta particles to pass through the amorphous semiconductor layer and into the adjacent material layers. This may not be a significant issue for the anode plate but could be for the bidirectional membrane material where bombardment by high energy particles could result in premature failure. See FIG. 7. By placing layers of a semiconducting material 45 on one or both sides of the radioactive material layer, the kinetic energy of the escaping alpha and beta particles can be used to generate electron-hole pairs in the semiconducting material. An additional benefit to using an amorphous semiconductor material in and around the radioactive material layer is that radioactive materials that emit higher energy particles can be used in the cell because the amorphous semiconducting material provides a protective layer for the bidirectional membrane and anode materials by absorbing much of the kinetic energy of these particles before they reach the bidirectional membrane and anode. This opens up the possibility of exploiting many more alpha and beta sources as radioactive materials for this battery which will lead to greater power capacities. This process is described in greater detail below.

Figure 7:
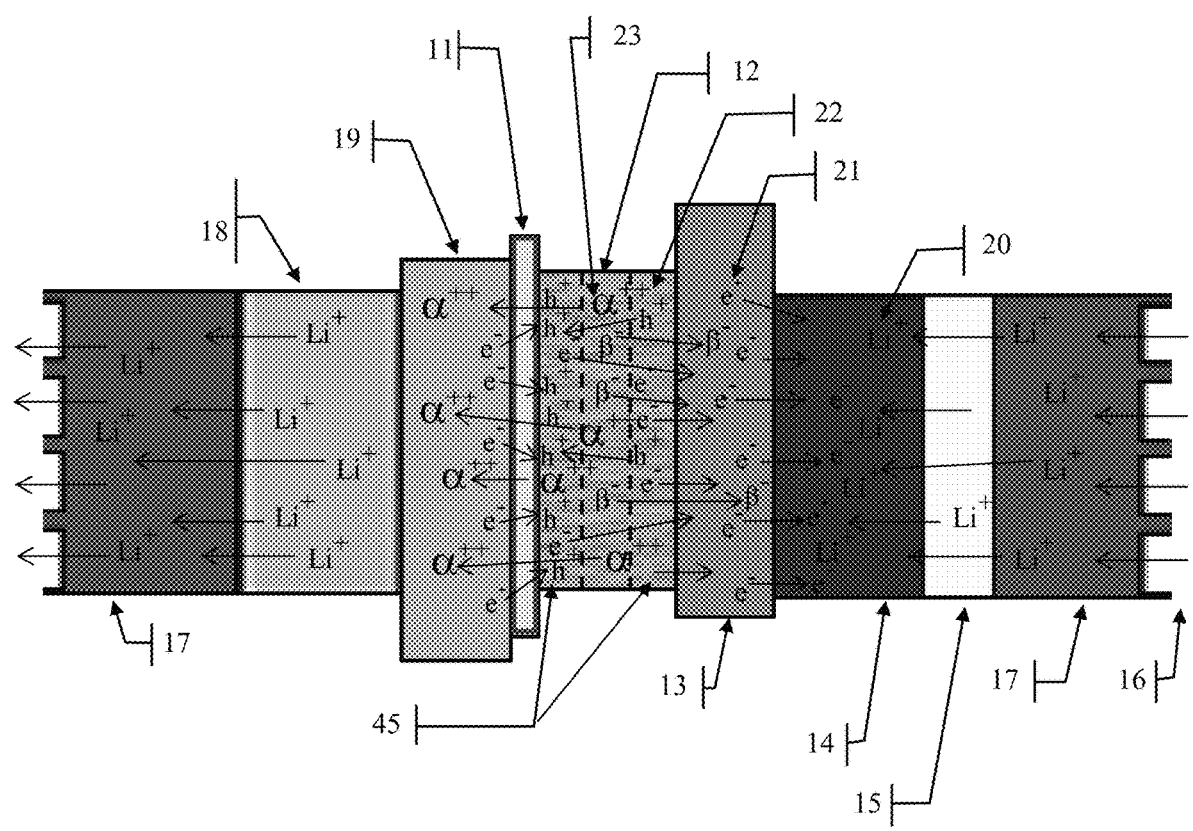
FIG. 7 illustrates a layered approach of placing an amorphous semiconducting material capable of producing large amounts of electron-hole pairs through bombardment of alpha or beta particles.
Figure 8:
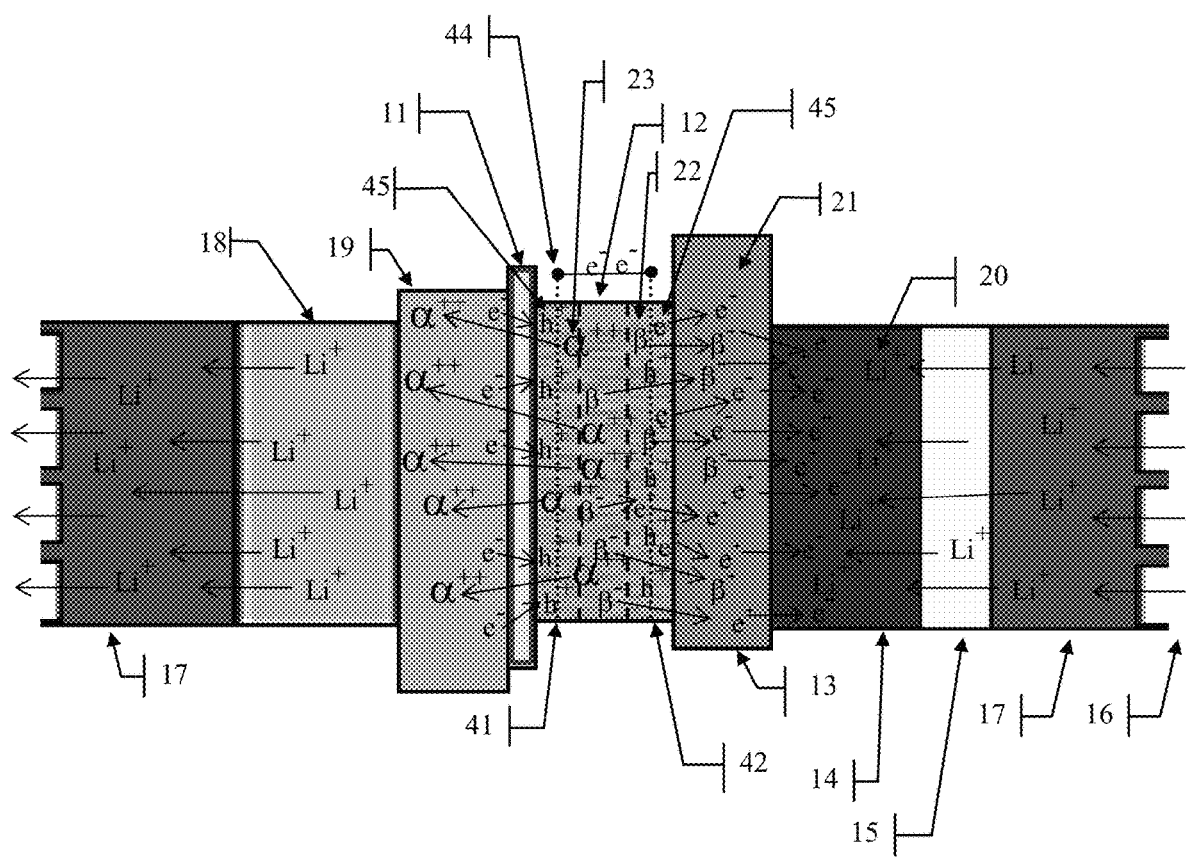
FIG. 8 illustrates the use of collector plates in or near the amorphous semiconducting material to aid in the collection of electron-hole pairs before they can recombine.
Figure 9:
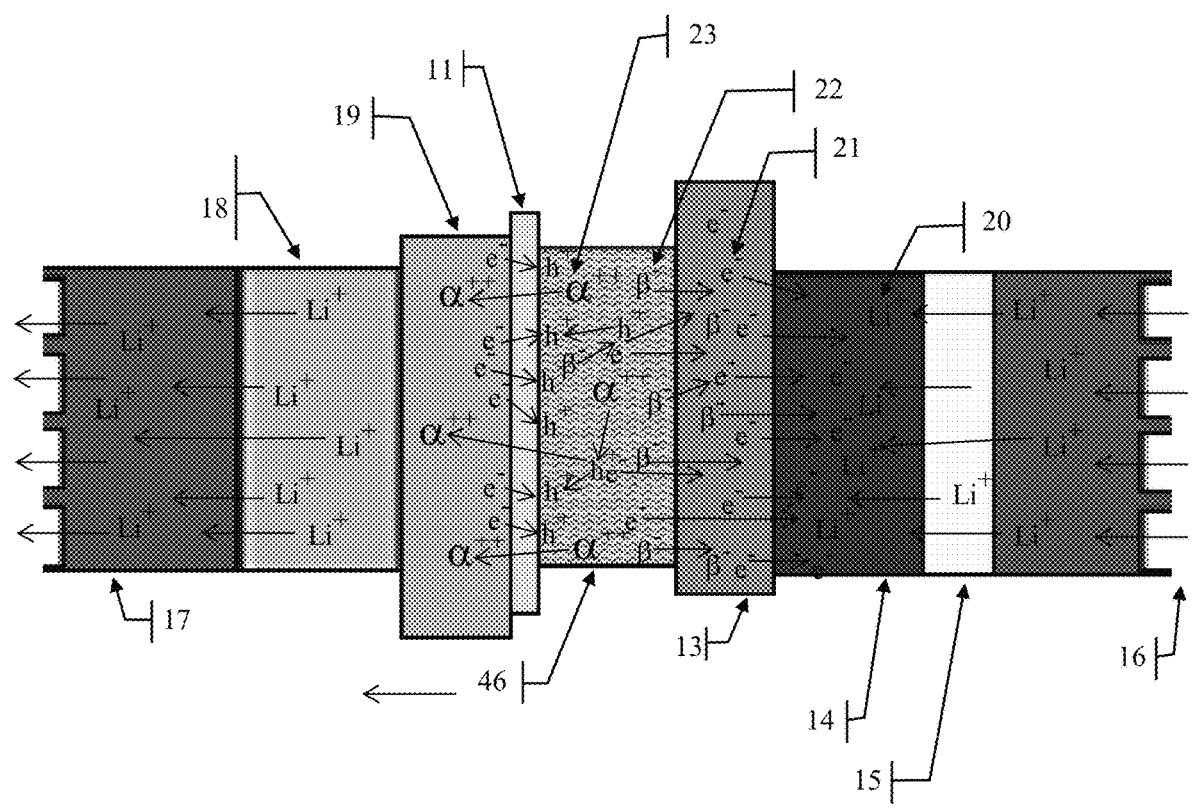
FIG. 9 illustrates the use of a mixture of radioactive material and amorphous semiconducting material in the cell.
Figure 10:
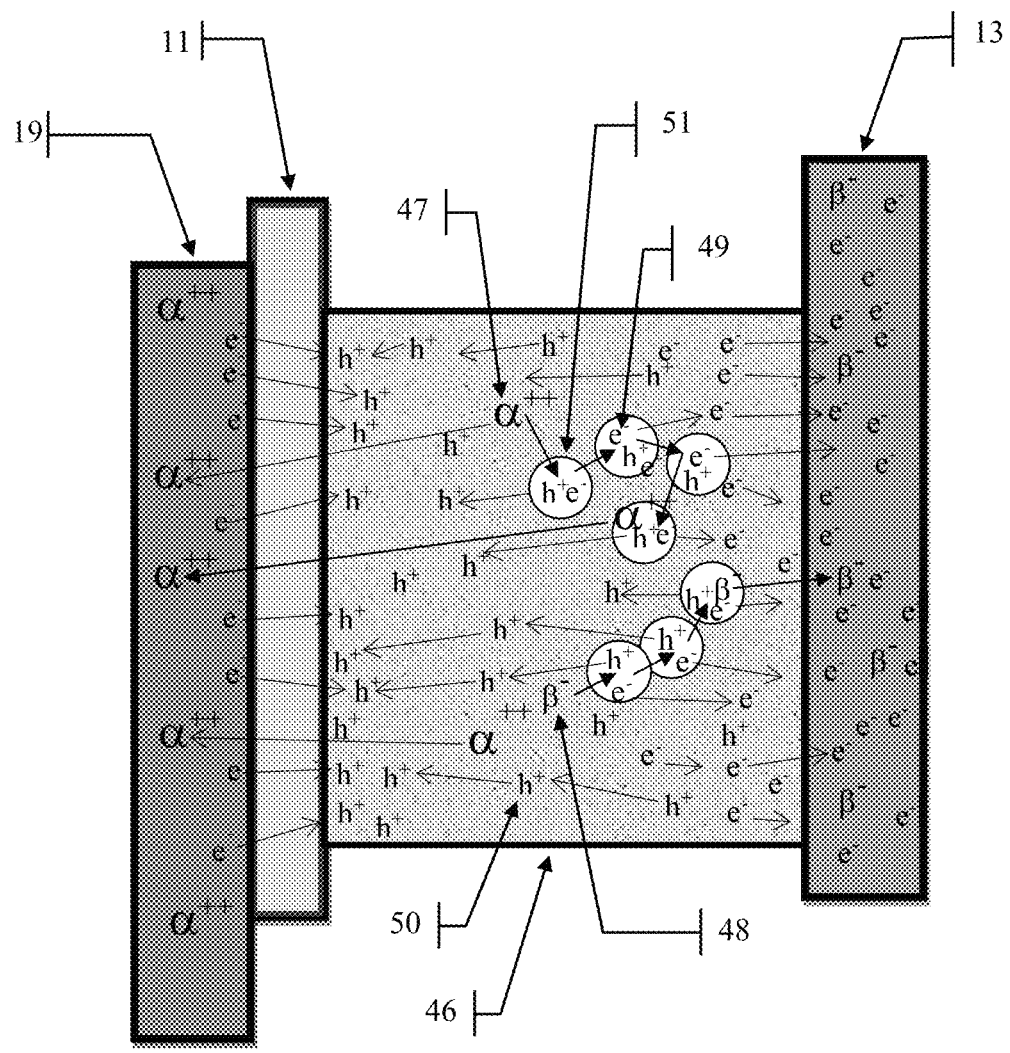
FIG. 10 illustrates the cascade of electron-hole pair production within a mixture of the radioactive material and the amorphous semiconducting material.

Referring to FIG. 10. When alpha or beta particles are spontaneously emitted from the radioactive source material, they will invariably run into other atoms and release some of their kinetic energy to those atoms. Some percentage of these interactions result in an electron of the target atom being knocked free. The freeing of an electron 49 from an atom results in the atom having an overall positive charge. This is referred to as a "hole" and is denoted as "$h^+$" 50. The physical interaction of the alpha particle 47 and the beta particle 48 within the semiconducting material can result in the formation of an electron-hole pair 51. If the electron 49 is knocked free from the target atom so that it cannot immediately recombine with the positive hole 50 then the two charges have a chance to migrate across the cell to the anode 13 and cathode 19. If the electron is immediately recaptured by the target atom from which it was liberated, or another atom with a positive charge, then the two charges will cancel out and no useful energy can be obtained. This is known as recombination and results in this energy being converted into heat. Since the amount of energy needed to free an electron in the semiconducting material is much, much, lower than the energy of the impinging alpha or beta particle, many electrons can be liberated and many holes formed within the semiconducting material before the particle's kinetic energy is absorbed. This process creates a cascade of electrons 49 and holes 50 from a single radioactive particle. FIGS. 7, 8 and 9 show variations of cell construction that can be used to optimize the electron-hole generation and capture based upon various cell chemistries and radioactive source particle energies. FIG. 10 shows the electron-hole generation that occurs within a mixture of radioactive source material and an amorphous semiconducting material. In this application, shown in FIG. 9, the overall thickness of the mixture would necessarily need to be much thicker than the very thin layer of the pure radioactive layer described earlier in order to increase the probability that the particles will interact with many semiconductor material atoms to generate the greatest number of electron-hole pairs 51. The down side to a thicker layer is the higher probability of recombination as the electrons and holes migrate across this layer. Experimentation with the radioactive source material and the semiconducting material will need to be done to optimize the layer 46 thickness. The optimal thickness of 46 will, of course, depend upon the nature of the materials used.

Referring back to FIG. 7, with a thin layer of amorphous semiconducting material 45, or any other material found to be a generous electron-hole pair generator, on one or both sides of the radioactive material layer 12, a single alpha or beta particle emission can be amplified hundreds or even thousands of times through interaction with the amorphous semiconducting material as shown in FIG. 10. The resulting electrons 49 and holes 50 will migrate across the semiconductor and radioactive material regions towards the appropriate cell plates. The longer migration path will increase the probability that the electrons and holes recombine before they reach the opposite plate.

The thickness of the semiconducting layers 45 will require experimentation to determine the optimal thickness. Two competing processes will tend cancel each other out. First, if the semiconducting layer is too thin then too many of the alpha particles 23 and beta particles 22 will pass through the layer without creating a cascade of electron-holes 51. Therefore, the thicker semiconductor layers 45 are, the greater the capture rate and the greater the electron-hole generation. Competing with that process is the rate of recombination which increases as the distance that the charges have to travel to reach the anode and cathodes increases. Just as in a betavoltaic semiconductor direct conversion device, a too thick amorphous semiconductor material layer will allow too many of the electron-hole pairs to recombine within the material itself canceling out their electrical usefulness in the cell.

Another issue to consider in cell construction are the electrical characteristics of the radioactive source material. The electrons 49 or holes 50 may not be able to migrate across the radioactive material layer either because the radioactive material may itself be a natural electrical insulator which would inhibit charge migration or perhaps it may have metal characteristics that promote the recombination of the electrons 49 and holes 50 as they migrate from the semiconducting material regions 45 across the radioactive source material region 12. A solution to this problem, see FIG. 8, could be to place porous collector plates 41 & 42 in or around the semiconducting material regions 45 and connecting them together to provide a path for electrons to flow across the radioactive material layer. The collector plates 41 & 42 in conjunction with connection 44 would provide a direct path for the electrons to reach the cell anode 13 and would reduce the distance that they would have to travel through regions 12 & 45 which in turn would reduce the probability of recombination and eliminate the potential electrical characteristics issues of the radioactive source material. In this embodiment the collector plate 41 would allow the alpha particles 47, and the holes 50 to pass through it to collect on the cathode plate 19, while collecting the beta particles 48 the electrons 49 while also providing a low impedance path through connection 43 to the anode 13.

See FIG. 9. Yet another embodiment would be to mix the amorphous semiconductor material with the radioactive material, as described above, and applying the mixture in a thin layer 47 that would allow the alpha and beta particles along with the electron-hole pairs they create to migrate across this region without a great probability of recombination or reabsorption could be a very effective technique. In this case, the alpha and beta particles 47 & 48 respectively, along with the electron-hole pairs 50 generated within the amorphous semiconducting material would migrate to the appropriate plates under the influence of the cell's electric field, thus producing far greater output capacity than the alpha and beta particles alone. One potential benefit to this embodiment is that the semiconducting material could work to counteract the electrical characteristics of the radioactive source material. The semiconducting material could act as a lower impedance path for the electron and hole migration across this layer than what the radioactive source material itself might have. This would aid the flow of charges across the radioactive layer. The net result would be a beneficial semiconducting medium that produces cascades of electrons 49 and holes 50 for each alpha particle 47 and beta particle 48. Again, experimentation to determine the optimum thickness of layer 46 and the relative amounts of the radioactive source material and semiconducting material would be required. This layer's characteristics will also be greatly influenced by the materials used.

Figure 11:
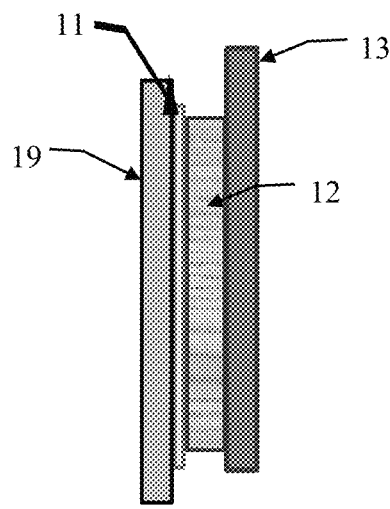
FIG. 11 illustrates an alternative embodiment of these teachings where no secondary energy storage is desired.
Figures 12A, 12B:
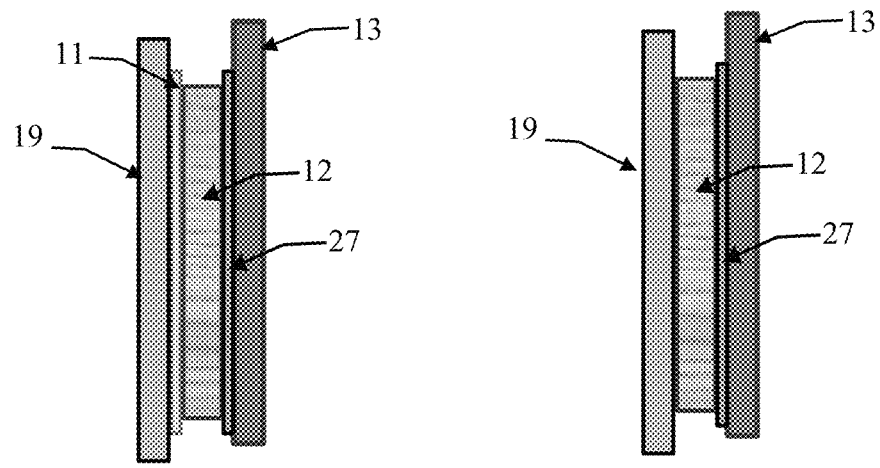
FIGS. 12a & 12b illustrate two alternative embodiments of these teachings where no secondary energy storage desired and where an anion exchange membrane is used with and without a proton exchange or bidirectional ion exchange membrane is used.
Figure 13:
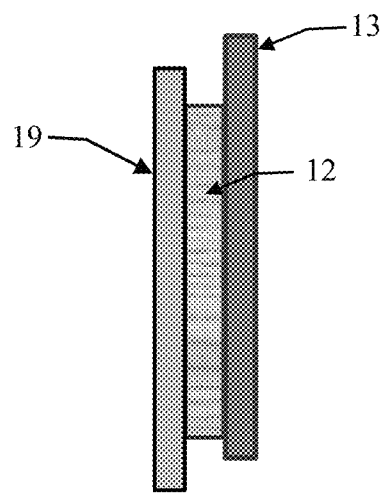
FIG. 13 illustrates an alternate embodiment where not ion exchange membranes are used.

FIGS. 11 through 13 show the structure of the most basic radioactive direct conversion cells using these teachings. It is anticipated that the techniques described herein can be exploited for radioactive direct conversion devices where self-recharging of a secondary battery is not needed or desired. Or where an external secondary battery or another energy storage device may be connected to this basic cell for charging. FIG. 11 shows one of the simplest implementation employing the anode 13, cathode 19, PEM or bidirectional membrane 11 and a radioactive material layer 12. In this embodiment, a minimum external load would be required to keep the cell voltage from potentially achieving tens of thousands of volts. The cell voltage will be determined by the current generated and the electrical resistance of the external load. Yet another embodiment of this cell can include the use of an anion exchange membrane either in conjunction with a PEM or bidirectional membrane layer or by itself as shown in FIG. 12. FIG. 12 shows the use of an anion exchange membrane 27 that allows electrons and beta particles to flow from the radioactive material layer to the anode 13, with or without the use of the PEM or bidirectional exchange membrane 11, the characteristics of the radioactive material layer may provide sufficient electrical isolation to allow the elimination of the PEM or bidirectional membrane 11 altogether. It is also anticipated that depending upon the electrical characteristics of the radioactive material layer, that this cell can be fabricated without a PEM or bidirectional membrane layer 11 or an ion exchange membrane 27, as in FIG. 13. In this implementation, the anode, cathode and radioactive materials can be selected to produce a cell wherein an electric field is generated across the radioactive material layer sets the cell voltage and prevents short circuiting. Selecting an anode 13 material with electronegative tendency such as copper and an cathode 19 material with a electropositive tendency such as aluminum in conjunction with a semiconducting radioactive material or mixture could result in a cell that would not require any isolation membranes 11 and 27. This option becomes more apparent when considering the use of nonmetallic variations of radioactive materials, such as the oxides of an elemental radioactive material or a mixture of a radioactive material and a semiconducting material as described throughout this specification. Finally, a complementary chemical combination of radio isotope mixtures with perhaps an electrolyte layer between this radioisotope material layer a the chemically complementary anode or cathode alloy material could develop an SEI (solid electrolyte interface) layer could create an electrical bandgap sufficient for this cell work without one or both of the isolation membranes.

All of the previous discussions pertaining to the basic self-recharging cell discussed in previous sections of this specification apply to these basic cell implementations shown in FIGS. 11 through 13 minus those aspects specifically directed to the self-recharging and energy storage features.

While the terms amorphous semiconductor and semiconductor are used to describe a preferred embodiment of this technique, it is not to be interpreted to be the only kind of material state that can be used to generate the electron-hole pairs. In fact, any mater or materials that produce electron-hole pairs when bombarded with radioactive particles whether amorphous, crystalline, polysilicon, nano-materials or any other forms, can be a suitable potential source material for the present invention.

External Charging and Power Monitoring and Control

The inherent nature of this self-recharging battery does not preclude the capability of a fast charging in an external charging device. A nuclear battery of this design can be quickly charged by means of inserting it into an external battery charger, similar to existing battery charging devices using standard charging techniques.

A self-monitoring circuit to indicate to the user the level of charge that the cell has at any given time can be incorporated into the device. Since the radioisotope would continuously charge the device, especially when it is not in use, power cells using this technology can be swapped out of equipment, set aside, and they will recharge automatically. Alternatively, they could be charged more quickly by an external charger device. The charge indicator would be powered by the device directly and would let the user know how much power is available at any given time.

An electronic circuit that could control the internal and external charging and discharging characteristics of the battery could be incorporated as a safety/security aspect of the device. This circuit could be used to control the total charge of the battery as well as to disable the battery recharge system to prevent automatic self-recharging or external recharging. This functionality would be useful in a battlefield situation where the battery may be lost or stolen. In such a situation, the battery could be rendered useless, or at least prevented from recharging. Such a system can be implemented by incorporating a built-in electronic chip/circuit that would enable or disable recharging or it could force discharging of the battery under specific conditions through the resistive load material used to bleed off excess power. For instance, such a condition may be where a warfighter would carry a tiny wireless control device (perhaps built into some other equipment) that would communicate with the battery controlling its functionality. Should the battery become lost or stolen and unable to communicate with some approved remote-control device, the battery could automatically render itself useless, either by discharging or not allowing itself to be recharged externally or internally, thus rendering it useless to anyone but those with the correct controller devices.

This same wireless control circuit could be used as a locator beacon that could be activated under any number of predefined conditions such as tampering or destruction of the cell in an attempt to obtain the nuclear materials.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

The invention claimed is:

1. A method for making a battery comprising the steps of:
   connecting one side of a radioisotope material to a cathode material;
   connecting an anode material to an opposite side of the radioisotope material;
   enclosing the radioisotope material, the anode material, and the cathode material inside housing material;
   coupling a first connection lead to the anode material; and
   coupling a second connection lead to the cathode material.

2. The method of claim 1, further comprising the step of positioning an electrolyte material next to, around, or mixed with the radioisotope material.

3. The method of claim 1, further comprising the step of positioning a semiconducting material next to, around, or mixed with the radioisotope material.

4. A method for making a battery comprising the steps of:
   connecting a first membrane having an electrolyte material to one side of a radioisotope material;
   connecting a cathode material to an opposite side of the first membrane and the electrolyte material;
   connecting an anode material to the other side of the radioisotope material;
   accommodating inside a housing the radioisotope material, the first membrane, the electrolyte material, the anode material and the cathode material;
   coupling a first connection lead to the anode material; and
   coupling a second connection lead to the cathode material.

5. The method of claim 4, further comprising passing positively charged particles and negatively charged particles from the first membrane or the electrolyte material to the radioisotope material or the cathode material.

6. The method of claim 4, further comprising positioning a semiconducting material next to, around, or mixed with the radioisotope material.

7. The method of claim 4, further comprising placing an electrochemical cell between the cathode material and the anode material.

8. A method for making a battery, comprising the steps of:
   connecting a first membrane to a first side of a radioisotope material;
   connecting an anode material to the first membrane;
   connecting a cathode material to a second side of the radioisotope material;
   accommodating in a housing the radioisotope material, the first membrane and electrolyte material, the anode material and the cathode material;
   coupling a first connection lead to the anode material; and
   coupling a second connection lead to the cathode material.

9. The method of claim 8, further comprising passing positively charged particles and negatively charged particles between the radioisotope material and the anode material.

10. The method of claim 8, further comprising positioning a semiconducting material next to, around, or mixed with the radioisotope material.

11. The method of claim 8, further comprising placing an electrochemical cell between the cathode material and the anode material.

\* \* \* \* \*